Figure 1:
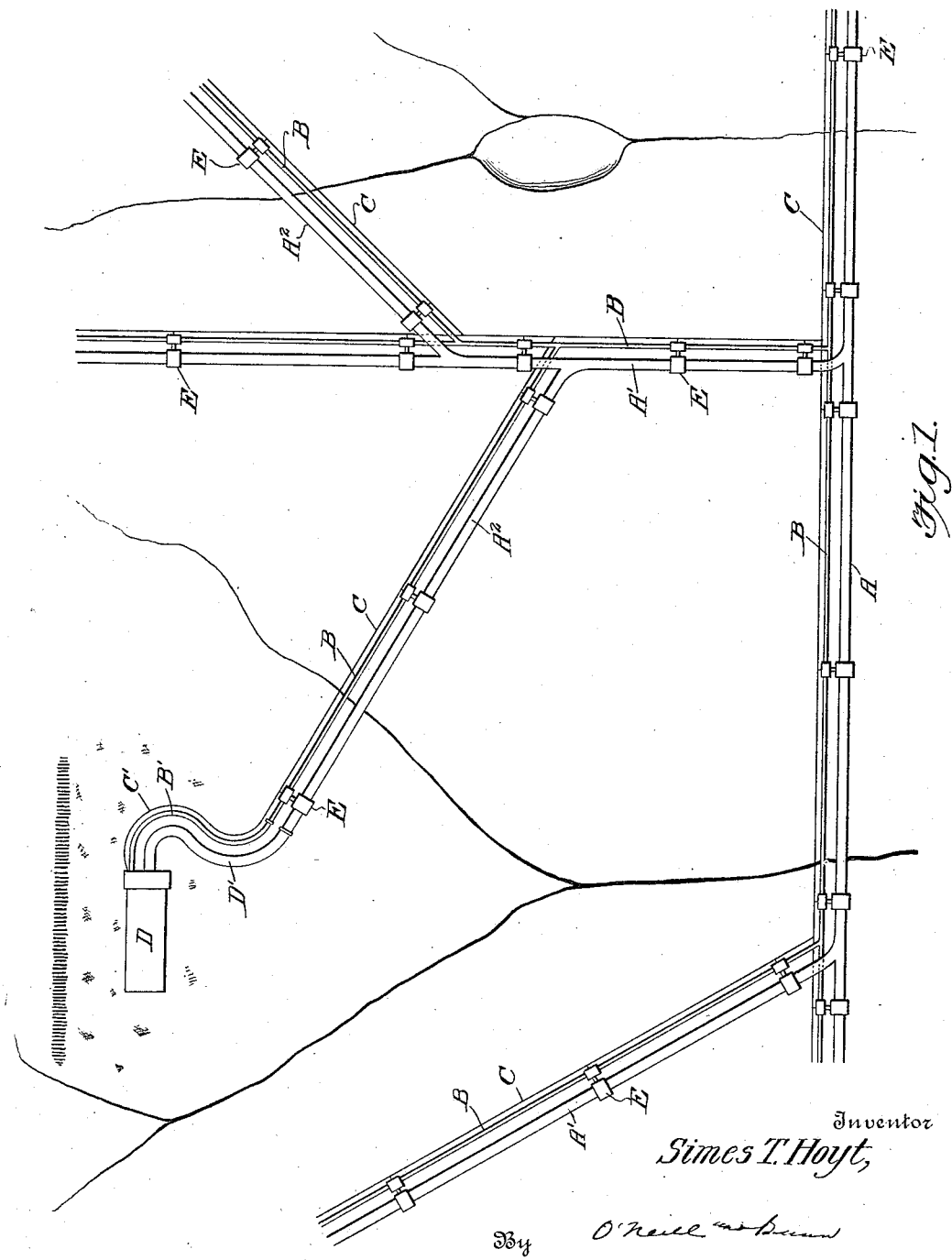

July 29, 1924.
S. T. HOYT
1,503,365
METHOD AND APPARATUS FOR HANDLING AND TRANSPORTING SUGAR CANE
Filed April 28, 1923    4 Sheets-Sheet 1

Inventor
Simes T. Hoyt,
By O'Neill and Bunn
Attorneys

July 29, 1924.

S. T. HOYT 1,503,365

METHOD AND APPARATUS FOR HANDLING AND TRANSPORTING SUGAR CANE

Filed April 28, 1923   4 Sheets-Sheet 4

Inventor:
Simes T. Hoyt,
By O'Neill and Bunn
attorneys

Patented July 29, 1924.

1,503,365

UNITED STATES PATENT OFFICE.

SIMES T. HOYT, OF HONOLULU, TERRITORY OF HAWAII, ASSIGNOR TO HAWAIIAN PINEAPPLE COMPANY, LIMITED, OF HONOLULU, TERRITORY OF HAWAII, A CORPORATION OF HAWAII.

METHOD AND APPARATUS FOR HANDLING AND TRANSPORTING SUGAR CANE.

Application filed April 28, 1923. Serial No. 635,371.

*To all whom it may concern:*

Be it known that I, SIMES T. HOYT, a citizen of the United States, residing at Honolulu, Territory of Hawaii, have invented certain new and useful Improvements in Methods and Apparatus for Handling and Transporting Sugar Cane; and I do hereby declare the following to be a full, clear, and exact description of the invention, such as will enable others skilled in the art to which it appertains to make and use the same.

This invention relates to a method and apparatus for handling and transporting sugar cane directly from the field to the mill, during the harvesting thereof, in an expeditious and efficient manner, and with the minimum amount of labor.

The present practice in sugar cane countries is first to cut the can by a gang of laborers, who simply throw it on to the ground as the cutting process proceeds. Subsequently, the cane is transferred from the field to the mill in any one of a variety of ways. It may be either by the laborers themselves carrying the cane, by pack animals, by trucks or animal-drawn wagons, or by other methods, such as fluming, or by rail. Where it is possible, fluming has heretofore proven the most economical of all methods of handling cane, but, due to the limited water supply, this is practiced on but few of the plantations in the localities where the present invention is particularly adapted for use.

The principal object of this invention is to overcome the previous difficulties of transportation, and resides in the provision of an apparatus and method whereby the cut sugar cane is conveyed from the field to the mill in the shortest possible time, resulting in a considerable saving of sugar. The present practice, however, owing to the slow and unsatisfactory means of transportation, leaves the cut cane on the ground in the field for various lengths of time, up to four or five days, and sometimes even a week before it can be moved to the mill, thereby entailing a considerable loss of sugar by inversion. The loss is commonly figured at three per cent per day, or for three days, which would be taken as the average, there would be nearly ten per cent loss of sugar.

The invention contemplates a system of transportation which is partly of permanent installation, partly temporary and partly portable, so that said system will be capable of being adapted for progressively cutting of cane in any number of different fields and, as the cane is cut, the process of conveying it to the mill will be immediately initiated and uninterruptedly continued during the harvesting period.

Another object resides in the provision of means whereby the transportation of the sugar cane to the mill is performed pneumatically, the system being provided with regularly-spaced blowers or boosters, whereby, during the passage of the cut cane to the mill, renewed impulses may be imparted thereto throughout its entire course of travel.

Another object is the provision of temporary and portable sections of the conveying conduits, said sections being equipped with blower mechanisms, permitting the introduction of cane to the main conduit, at any portion of the particular field being harvested.

A still further object of the invention is to associate with the receiving end of the conveyor a mobile unit comprising a cutter and blower, for the purpose of cutting up the cane in proper lengths to be received by the conveyor, the blower connected with the cutter providing the necessary force for directing the cane into the conveyor, where it is subsequently picked up and continuously conveyed through the proper conduit by the regularly spaced blowers or boosters provided throughout the system.

A still further object of the invention is the provision of a water supply associated with the cutter and blower at the receiving end of the conveyor, whereby the water is mixed with the chopped cane and, during its travel through the conveyor, prevents the passage through and between the cut portions of cane, of the propelling air from the several blowers.

Other objects of the invention will be made apparent in the following specifications, when read in connection with the drawings forming a part thereof.

Figure 2:
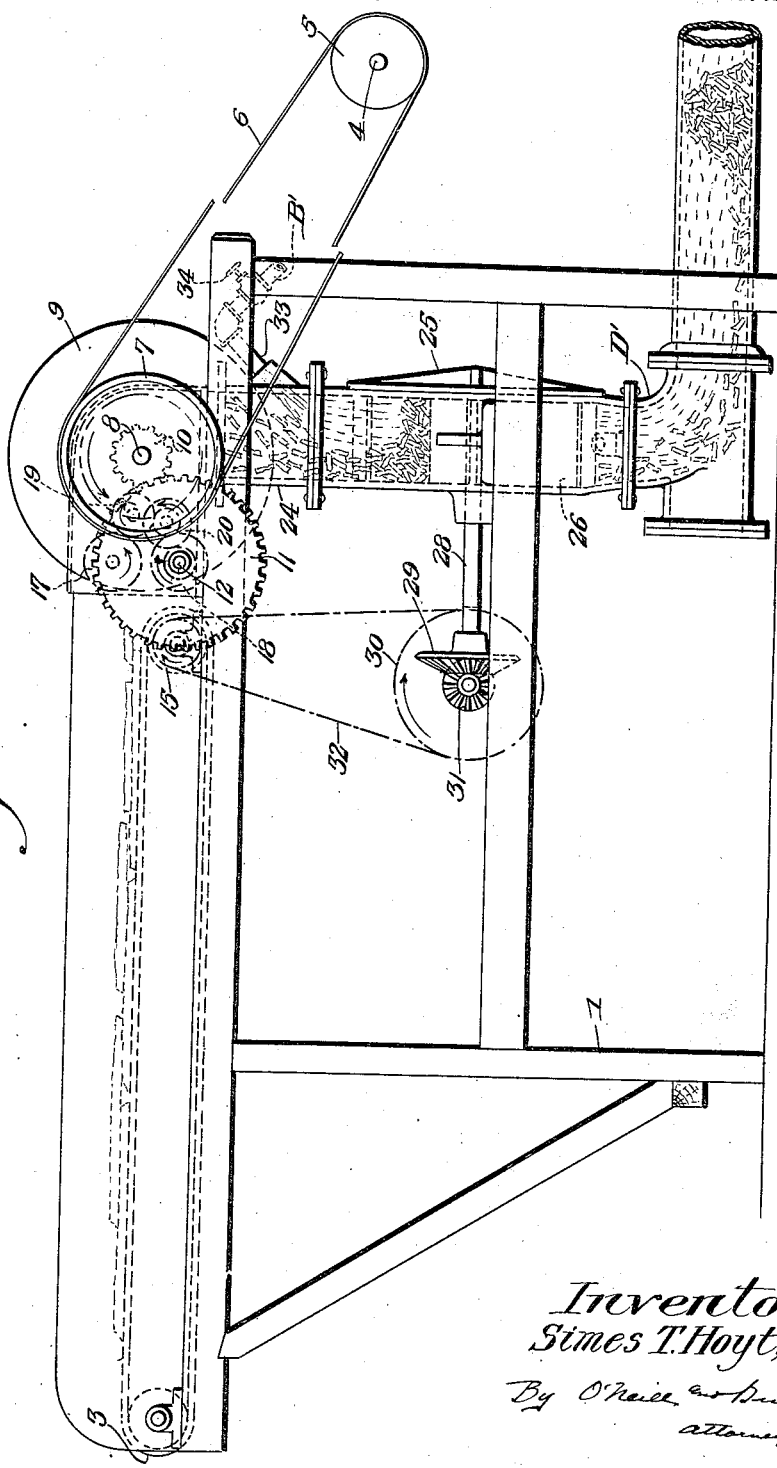
Figure 3:
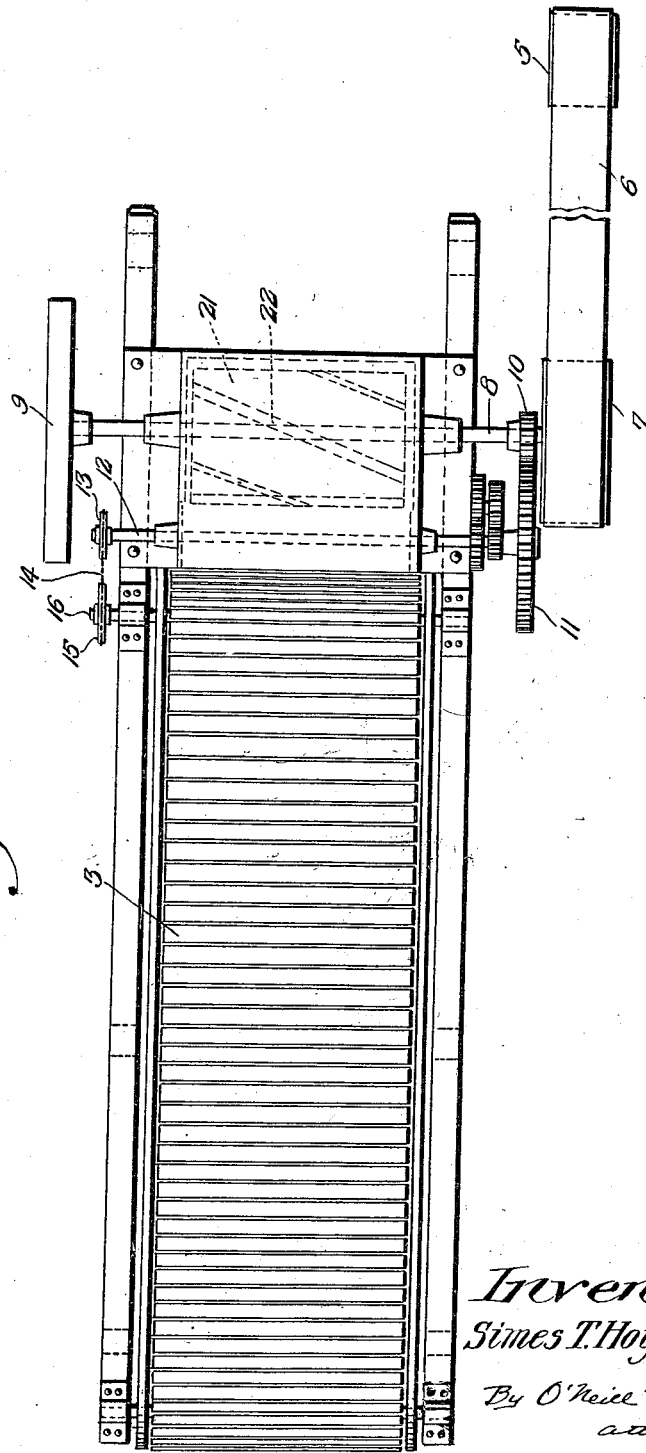
Figure 4:
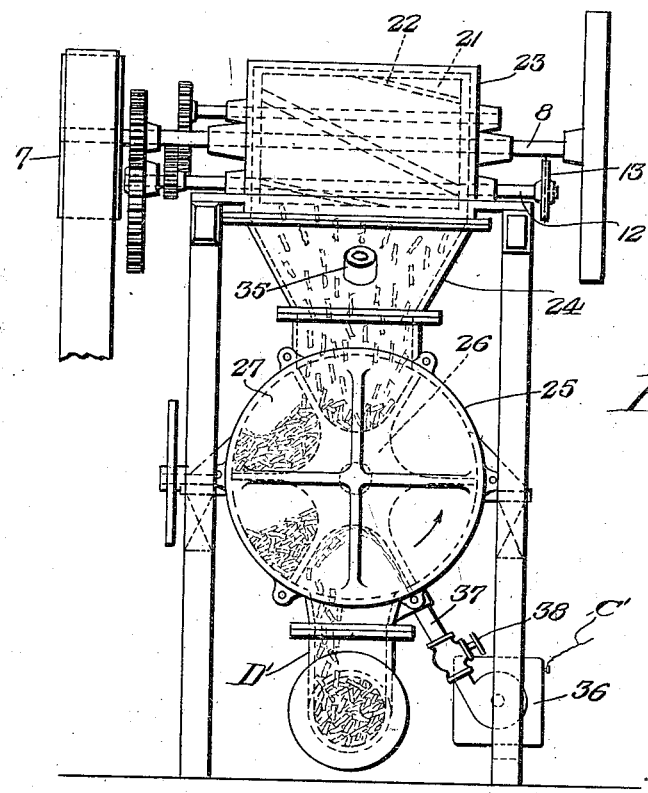
Figure 5:
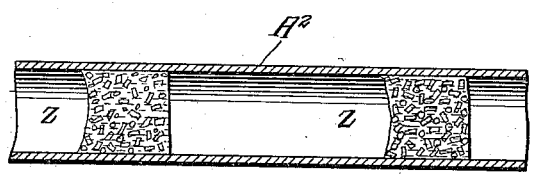

In said drawings:

Fig. 1 diagrammatically represents, generally, the arrangement of the particular field being harvested, showing the particular disposition of the conduits hereinafter to be referred to, Fig. 2 is a side elevation of the cutting and chopping mechanism for preparing the cane for transit through the conduit, Fig. 3 is a top plan view of the machine shown in Fig. 2, Fig. 4 is an end elevation of the machine shown in Fig. 2, and Fig. 5 is a partly diagrammatic view showing sections of the cane and water passing through the conduits.

Now referring specifically to the drawings, Fig. 1, in particular, A indicates a permanently positioned conduit extending from a sugar mill, not shown, to the harvesting field. The conduit A may be provided with a plurality of branches $A^1$, and from said branches may extend sub-branches $A^2$. It is of course understood that the particular lay out will be conditioned upon the location of the harvest field, and that the number and disposition of the branches $A^1$ and sub-branches $A^2$ is dependent upon the arrangement of the fields and the crops being harvested thereon. Broadly speaking, it may be stated that the main conduit A is positioned to extend to the approximate vicinity of the field; the branches $A^1$ extend into the field, and the sub-branches $A^2$ extend more nearly to the particular crops being harvested. The main conduit A is permanently positioned, but the conduits $A^1$ and $A^2$ are preferably temporarily positioned, dependent on whether the fields which they enter are permanent sugar cane fields, as will be understood.

A water supply pipe B is here shown as being connected to the conduits and branch conduits, and an electric cable C is similarly supported and connected. The pipe B and the cable C both run to the mill and receive water and current therefrom. In the practical operation of the apparatus it will be understood that the cane is chopped into small portions by a machine indicated diagrammatically in Fig. 1 by the letter D, a flexible and portable conduit $D^1$, a pipe $B^1$, and an electric connection $C^1$, having first connected the branches $A^2$, the pipe B and the cable C to the machine D. At the machine D, water from the pipe $B^1$ is added to the chopped cane, and the mixture of water and cane is divided into sections, as will hereinafter appear, and the sections successively introduced into the receiving end of the portable conduit $D^1$, and subjected at its rear end to a blast of air from one of the electric blowers E, mounted on the machine and supplied with current from the cable C.

The air delivered by the first blower or booster E, against the mixture in the conduit is amply sufficient to conduct it to the zone of the next booster E, and it will be understood that a sufficient number of such boosters will be positioned along the line of the conduit to insure the expeditious delivery of the cane and water to the mill.

The machine D for preparing the cane, may be mounted on a tractor, if more convenient, but is here shown stationary. It comprises a frame 1, supporting a table 2, provided with an endless conveyor 3, as illustrated in Figs. 2, 3 and 4. The power for operating the conveyor 3 is furnished by means of a shaft 4 connected to a suitable motor, not shown, and carrying a pulley 5, over which is trained a belt 6, engaging a larger pulley 7, mounted on a shaft 8, near the rear end of the conveyor 3, and extending transversely thereof. The shaft 8 carries a fly-wheel 9 at the end opposite the pulley 7.

The shaft 8 carries a pinion 10, in mesh with a gear 11, mounted on one end of a transversely extending shaft 12, the other end of said shaft carrying a sprocket 13, connected by a chain 14, to a similar sprocket 15 carried by one end of a shaft 16, upon which the conveyor roller is mounted, the other end of the shaft 16 having a bearing in a longitudinal sill of the frame 1.

Adjacent the delivery end of the conveyor 3 are mounted two feed rollers, 17 and 18, rotated by the shaft 12, through gears 19 and 20, as will be understood. The rollers are adapted to take the front ends of the cane stalks from the conveyor 3.

Mounted on the shaft 8 is a rotary cutter 21, provided with a plurality of spirally-arranged blades 22, and covered by a housing 23. In operation the rollers 17 and 18 deliver the ends of the cane stalks to the zone of rotation of the blades 22, where the ends are chopped off and allowed to drop into a hopper 24.

Supported between parallel side-sills of the frame 1 is a circular casing 25, open at the top and secured to the exit of the hopper 24 by connected flanges, or in any other suitable manner, and open at the bottom, and similarly connected to the intake end of the portable conduit $D^1$.

Within the casing 25 is mounted a rotary valve 26, provided with a plurality of pockets 27, each adapted, upon rotation of the valve 26, to successively present its mouth to the delivery end of the connected end of the hopper 24, and to later present its mouth to the receiving end of the portable conduit $D^1$.

The valve 26 is mounted upon a shaft 28, extending toward the front of the frame 1, and carrying a beveled gear 29 at its outer end. A pulley or sprocket 30, provided with a beveled gear 31, is connected by a belt or chain 32, to the sprocket 15, carried by the shaft 16 whereby the power for rotating the valve 26 is taken from the shaft 12.

The water pipe branch $B^1$ is provided with a connection comprising a nozzle 33, controlled by a valve 34, and leading into an opening 35 to the hopper 24. An electrically operated air compressor and blower 36 is carried by the machine, and is supplied with current by the connection $C^1$, and the air compressed thereby is directed through a jet-nozzle 37 extending through the wall of the casing 25 immediately above the receiving end of the conduit $D^1$. A valve member 38 is positioned to control the flow of compressed air delivered by the compressor 36. Obviously the compressor may be operated by power from the shaft 4.

In the practical operation of my invention it is to be understood that the boosters E, remote from the machine D, and hereinbefore referred to, may comprise only the compressor 36, adapted to direct a current of air, under high velocity, against the mixture of chopped cane and water traveling through the conduits A, $A^1$ and $A^2$, the air being, of course, directed at a very acute angle to the line of travel of the mixture. However, where warranted by existing conditions, the boosters E may include a receiving hopper 24, and the valve 26 provided with pockets 27, adapted to be cleared by air delivered from the compressor 36, as described in connection with the booster at the main receiving end of the conduit. In all cases, of course, it is essential that the compressed air be delivered to insure the continuous travel of the mixture through the conduit.

When suitably adjusted by gearings, the speed of rotation of the valve 26 may be so governed as to control the amount of cane and water in each of the pockets 27, prior to the time it reaches the receiving end of the portable conduit $D^1$. It will be noted that the mouth of the pocket 27 is somewhat larger than the mouth at the receiving end of the conduit $D^1$, and that the compressed air from the jet 27 is not operative against the contents of the pocket until after the contents therof have fallen into the end of the conduit. The air then operates and sweeps the rounded walls of the pocket clear of the particles which may have adhered thereto, and impacts the mixture into a relatively compact mass of chopped cane and water, each compacted mass comprising a unit having compressed air on each side in the zone Z, as somewhat diagrammatically shown in Fig. 5 of the drawings.

Since the air is applied to the rear end of the units, they are forced to move forwardly, the movement throughout the entire conduit system necessarily being continuous, because of the continuous supplementing power applied by the boosters E.

The compressed air against the units operates along the well-known air lift pump principle. The air cannot pass the units, since they are composed of a solid mass of chopped cane and water, and the air therefore acts as a piston by means of which the units are forced longitudinally of the pipe to the mill.

While not confining myself to the figures hereinafter specified, experiments have convinced me that by using a conduit pipe having an interior diameter of four inches, twenty tons of cane per hour could be delivered to the mill by the use of water as described, utilizing one cubic foot of free air to one pound of cane, the moving power required being one to three H. P. per hundred feet, according to the velocity. The booster stations E could be located approximately 600 feet apart, more or less, dependent upon the actual pressure used, and the velocity desired.

It is, of course, to be understood that various forms of chopping and feeding devices may be used at the receiving end of the conduit; and various means may be utilized for the delivery of the water to the hopper 24 and to operate the compressor 36, but I have here shown only one of the many practical methods of operating these devices.

By the operation of the system as above described, it will be understood that as the cane is cut, it is immediately thrown upon the conveyor 3, and that the instrumentalities before described then operate to automatically deliver it to the mill. All of the boosters E may be electrically controlled at the mill, where the operator may best judge as to whether the units are arriving with the proper speed and regularity. The boosters E may of course be designed to deliver more or less power, and the power being delivered by any one, or any set of boosters, may be varied at will by the mill operator, or may be cut out of operation, or energized at will. By such a system it will be obvious that a continuous stream of cane may be assured, while the system is in operation. If the cane should ever become clogged in the conduits, the operator could cause a number of, or all of the boosters, to develop maximum efficiency, and force the clogged material out of the discharge end of the conduit.

It will be apparent that, since the cane is delivered to the conduit as it is cut, there will be no loss of sugar by inversion. A very small amount of the juices of the cane may be dissolved by the water, but this need not be lost, since all or nearly all of the water used in the transportation of the cane may be used for maceration water in the milling process, and any excess may be pumped back to the fields for additional cane transportation.

While I have described a preferred embodiment of my invention, it is understood that I am not limited thereby, as the invention comprehends all modifications covered by the appended claims.

I claim:

1. The method of conveying chopped cane or similar material to a mill, through a conduit leading from the harvesting field to the mill, which consists in adding a fluid to the said cane, leading the mixed cane and fluid to the receiving end of the conduit, dividing the mixture of cane and fluid into sections, and directing a blast of compressed air against the separate sections, whereby to impel them towards the discharge end of the conduit, substantially as described.

2. The method of conveying chopped cane or similar material to a mill, through a conduit leading from the harvesting field to the mill, which consists in adding a fluid to the said cane, leading the mixed cane and fluid to the receiving end of the conduit, dividing the mixture of cane and fluid into sections, directing a blast of compressed air against the separate sections whereby to impel them towards the discharge end of the conduit, and thereafter applying additional supplies of compressed air to said sections, during their passage through the conduit, substantially as described.

3. A conveying apparatus for chopped sugar cane and similar material, comprising a conveyor conduit having its discharge end at the mill and its receiving end at the harvesting field, a portable conduit adapted for connection to the main conduit, and means adapted for connection to the receiving end of said portable conduit, to add a fluid to the chopped cane, to divide said mixture of cane and fluid into measured sections, to successively introduce said sections into the receiving end of the portable conduit, and to subject each section, after it is received in the conduit, to a blast of compressed air, substantially as described.

4. A conveying apparatus for chopped sugar cane and similar material, comprising a conveyor conduit having its discharge end at the mill, and its receiving end at the harvesting field, a portable conduit adapted for connection to the main conduit, means adapted for connection to the receiving end of said portable conduit, to add a fluid to the chopped cane thereto, to divide said mixture of cane and fluid into measured sections, to successively introduce said sections into the receiving end of the portable conduit, and to subject each section, after it is received in the conduit, to a blast of compressed air, and means for applying additional compressed air to the rear of said sections, during their passage through said conduits, substantially as described.

In testimony whereof I affix my signature.

SIMES T. HOYT.